April 18, 1961 M. M. SEELOFF ET AL 2,980,074
FLUID DRIVE MEANS FOR INDEXING APPARATUS AND THE LIKE
Original Filed Nov. 30, 1951 3 Sheets-Sheet 2
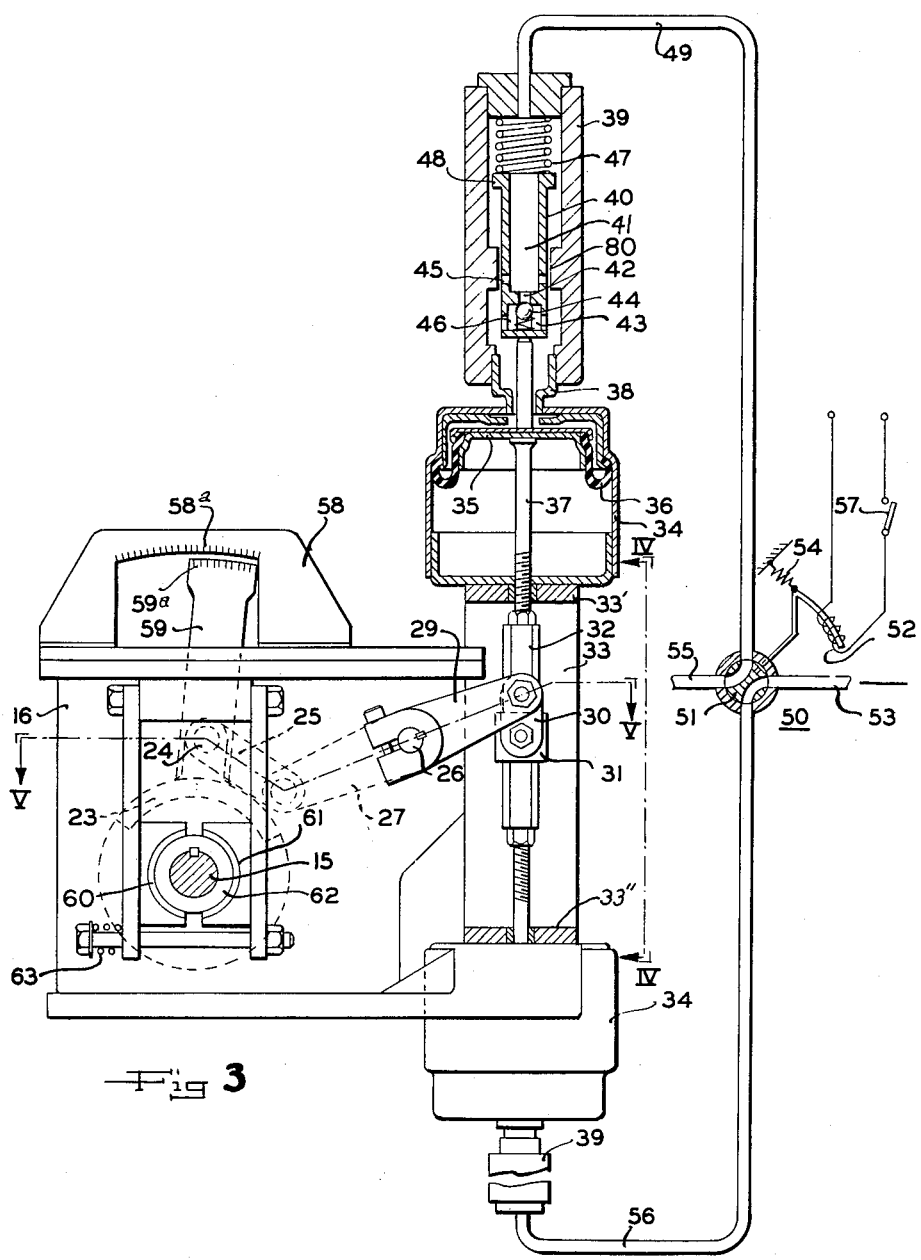
INVENTORS
MELVIN M. SEELOFF
DONALD M. CAMPBELL
BY Francis J. Klempay
ATTORNEY INVENTORS
MELVIN M. SEELOFF
DONALD M. CAMPBELL
BY Francis J. Klempay
ATTORNEY ately 2,980,074
Patented Apr. 18, 1961

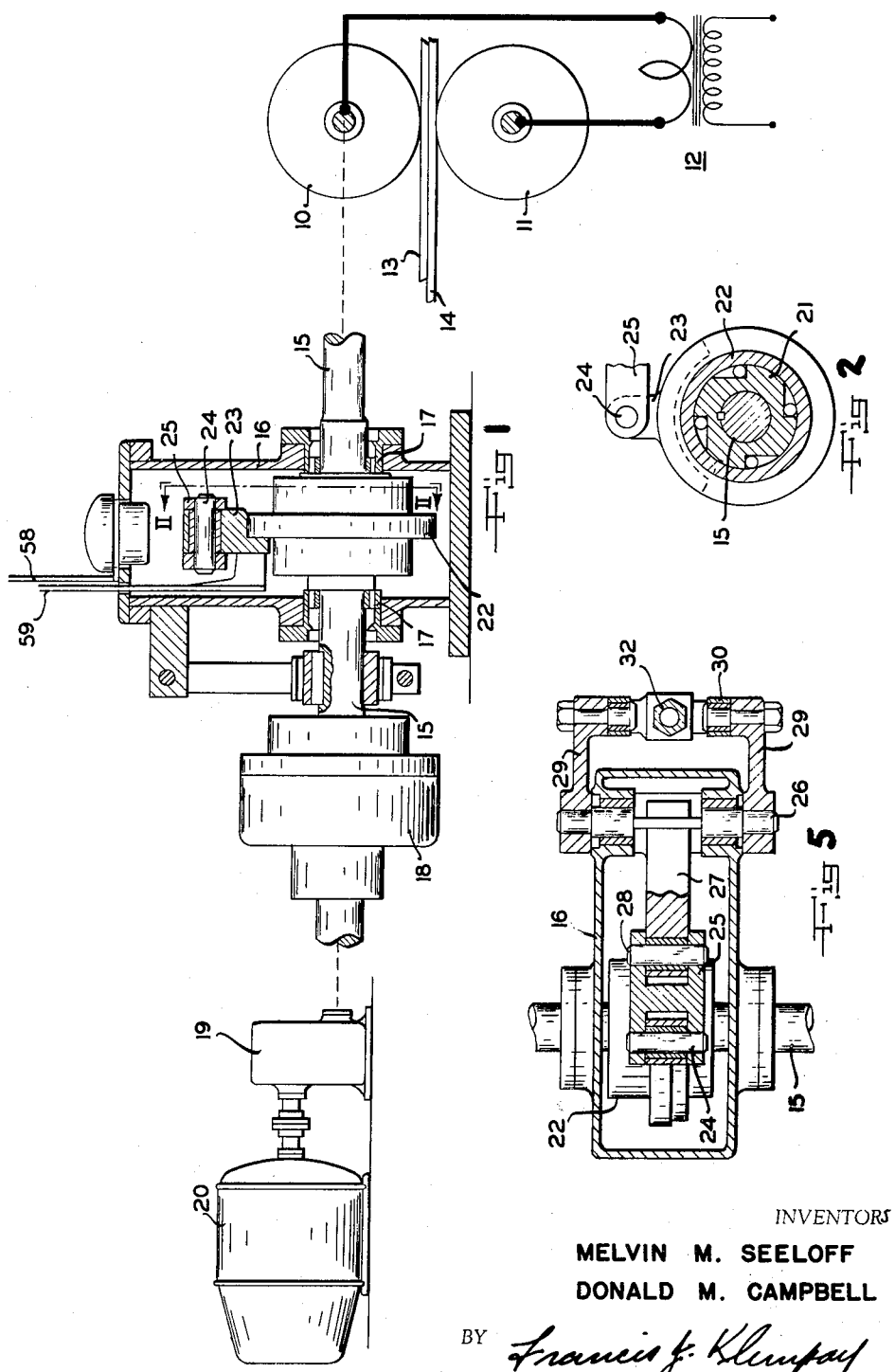

2,980,074
FLUID DRIVE MEANS FOR INDEXING APPARATUS AND THE LIKE

Melvin M. Seeloff and Donald M. Campbell, Warren, Ohio, assignors to The Taylor-Winfield Corporation, Warren, Ohio, a corporation of Ohio Original application Nov. 30, 1951, Ser. No. 259,168, now Patent No. 2,850,909, dated Sept. 9, 1958. Divided and this application July 15, 1958, Ser. No. 748,633

13 Claims. (Cl. 121—48)

The present application is a divisional application of our co-pending patent application, Serial No. 259,168, filed November 30, 1951, and which has since matured into United States Patent No. 2,850,909.

The present invention relates generally to improved fluid drive means and more specifically to fluid drive means adapted for driving indexing and other like apparatus in a highly versatile manner. It is an object of the present invention to provide a relatively simple and inexpensively manufactured double-action drive means for indexing apparatus and the like which is capable of extremely high speeds of operation and actuation but yet is capable of being readily adjusted to infinitely vary not only the dimensions of movement in each operation but also the speed of movement and the time interval elapsing between successive actuations or movements of the machine parts to be driven.

Another object of the present invention is the provision of fluid drive means wherein the usable life of the drive means is extended, the actuations thereof are highly responsive to control due to reductions in inertia and starting friction of the parts and wherein high speed operations may be obtained with a reduction in the number of actuations of the control valve employed.

A further object of the present invention is to provide drive means of the character described wherein the reciprocating parts of the assembly are automatically and effectively cushioned against shock at the ends of their strokes. In accordance with this object of the invention there is provided as an integral part of the fluid drive means an improved cushioning valve assembly which automatically begins to controllably meter the fluid exhausting from the double-acting fluid drive means as it approaches the ends of its strokes. In this manner shock forces are eliminated thereby insuring smooth and continuous operations of the fluid drive means.

The above and other objects and advantages of the invention will become apparent upon consideration of the following detailed specification and accompanying drawing wherein there are disclosed certain preferred embodiments of the invention. In the disclosed embodiments of the invention the fluid drive means is shown used in connection with indexing apparatus for a roller-type electric resistance seam welder. However, the fluid drive means is not limited to such a specific use and is adapted to be employed in powering other mechanisms and apparatus as will be understood by those skilled in the art.

In the drawing:

Figure 1 is a schematic view, with parts shown in section, of a driving apparatus for rotary welding electrodes constructed in accordance with the principles of our invention;

Figure 2 is a fragmentary section taken along the section line II—II of Figure 1;

Figure 3 is a side elevation, partially in section, of the apparatus of Figure 1 and showing the fluid motors and control therefor utilized in the assembly of Figure 1;

Figure 5 is a plan sectional view taken along the section line V—V of Figure 3.

Figure 4:
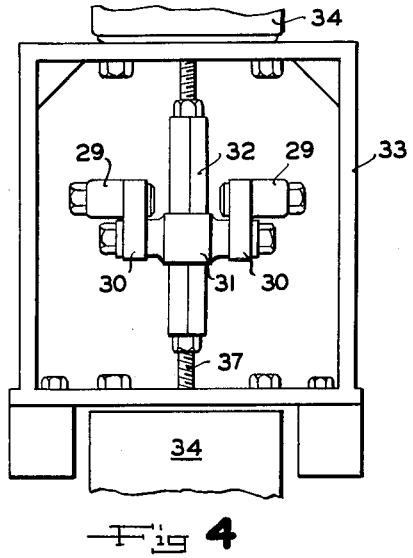
Figure 4 is a fragmentary elevation looking in the direction of the arrows IV—IV of Figure 3.

Referring to the drawing and first particularly to Figure 1 the reference numeral 10 designates a driven electrode while reference numeral 11 designates a cooperating idler electrode of a seam or roller-spot electric resistance welder having a welding transformer 12 the secondary of which is connected to the electrodes 10 and 11. In accordance with usual practice, overlapped workpieces 13 and 14 are fed between the electrodes 10 and 11 to be welded together either by an uninterrupted seam or by a series of longitudinally spaced spot welds. The driven electrode 10 propels the work through the machine and if spot welds are to be effected, as in heavier gauge material, it is usually necessary to interrupt movement of the electrodes and work during the time required to effect a welding cycle. The time interval for this "dwell" as well as the extent of indexing movement of the electrodes between welds is readily adjustable in the normal operation of our apparatus as will be explained below.

Electrode 10 is arranged to be driven by a shaft 15 which extends through an oil-tight housing 16, being journaled therein by anti-friction bearings 17. Beyond the housing 16 the shaft 15 is connected through an over-running clutch 18 of the multiple roller type to a gear reducer 19 which is driven by a motor 20. The reducer 19 may well be of the variable speed type as will be understood. Thus, the electrode 10 may be driven continuously at a predetermined speed by the motor 20 whenever desired and in a direction tending to advance the work through the machine, it being understood that the energization of motor 20 will be effected by suitable control apparatus, not shown, and that the clutch 18 will be properly oriented to give the proper direction of drive.

Keyed to the shaft 15 within the housing 16 is the inner member 21 of a multiple roller over-running clutch having an outer race 22 whose outer flanges revolve freely on the shaft 15 outwardly of the part 21. Of course, the race 22 will be constructed in two parts to permit assembly of the apparatus as will be understood. A segmental lug 23 is integral with or rigidly secured to the outer periphery of the race 22 and pivotally connected to this lug by pin 24 is a toggle link 25. Extending through and journaled in the opposed side walls of the housing 16 is a shaft 26 to which is rigidly keyed a lever 27 which is contained within the housing 16 and which is pivotally connected at its free end to link 25 by means of pin 28.

Rigidly secured and keyed to each projecting end of the shaft 26 is a rearwardly extending lever 29 which is pivotally connected at its free end to a short link 30. The free ends of the links 30 are in turn pivotally connected to a crosshead 31. Crosshead 31 mounts a turnbuckle 32, it being understood that while the turnbuckle 32 can be rotated with respect to the member 31 the mounting is such that there is no axial movement of the turnbuckle with respect to the member 31.

Rigidly mounted on the casing 16 is an open frame 33 having top and bottom struts 33' and 33'', respectively, on each of which is mounted an outer shell or cylinder 34 of a fluid-operated device having, in addition to the outer shell, a piston 35 the outer periphery of which is connected to the side wall of the outer shell by a flexible rolling ring 36. Piston 35 is mounted on a centrally disposed rod 37 which is threaded at its lower end for engagement in the turnbuckle 32 and, as shown, the outer end of the rod 37 projects outwardly of the shell 34 through a fitting 38 and into a tubular member 39 which houses a cushioning valve now to be described. Since the fluid motors and the cushioning valves are identical for opposite ends of the turnbuckle 32 only one of the assemblies will be shown and described in detail.

Tubular member 39 has a centrally disposed bore extending entirely through it and slidably received in a centrally disposed section of this bore which is of reduced diameter as at 80 is a valve core 40 which has a bore in it extending downwardly from its top end and terminating at a horizontal wall in which is formed a small aperture 42. Cooperating with aperture 42 and housed within a cavity 43 formed in the lower end portion of the core 40 is a spring pressed ball 44 which normally seals off aperture 42. The side walls of the core 40 are apertured at 45 at the lower end portion of bore 41 and at 46 at the location of the cavity 43 housing ball 44. Core 40 is urged to an inner position by a coil spring 47 housed in the outer end portion of the tubular member 39 but inward movement of the core is limited by engagement of the flange 48 on the upper end of the core with the shoulder provided by the outer end of the restricted portion 80 of the bore in the member 39. The space within the outer end portion of the tubular member 39 is connected by conduit 49 leading to a cylinder port of a four way valve 50. As schematically shown the valve 50 has a movable core 51 arranged to be moved into one of its operating positions by energization of a solenoid 52 whereby the conduit 49 is connected to a fluid pressure supply conduit 53 and into the other of its positions by a return spring 54 whereby the conduit 49 is connected to exhaust 55. The opposing fluid motor of the assembly is connected to the other cylinder port of the four way valve 50 through a conduit 56 which is connected to the pressure supply line 53 when solenoid 52 is deenergized but which is connected to exhaust 55 when solenoid 52 is energized. Solenoid 52 is arranged to be alternately energized and deenergized by closing and opening a switch 57 and in actual practice such switch will be automatically actuated by suitable means, not shown, whereby a predetermined rate of actuation of the mechanism herein described may be obtained.

The operation of the apparatus described above is as follows:

Assuming the parts to be relatively positioned as shown in the drawing—i.e., with the pistons 35 and the turnbuckle 32 in their uppermost positions—the outer race 22 of the over-running clutch will be in its most advanced rotational position because of the maximum angular relation of the toggle links 25 and 27 to one side of the common plane of the axes of pins 24 and 26. If switch 57 is now closed fluid pressure is admitted through conduit 49 into the upper end of tubular member 39 and into the bore 41 of the valve core 40 and thence through aperture 42 against the ball check 44. The latter opens and fluid is admitted through aperture 46 into the lower end of the tubular member 39 and through fitting 38 into the outer end of the cylinder 34 causing the piston 35 and the rod 37 to move downwardly. As the rod 37 moves downwardly the valve core 40 follows it under the action of the spring 47 and eventually the apertures or ports 45 are uncovered to admit a much larger quantity of fluid into the cylinder 34. Rod 37 has abutting relation with the inner end of the valve core 40 and after downward movement of the latter is arrested by the flange 48 engaging the restricted portion 80 of the tubular member 39 the outer end of the rod 37 moves away from the core 40.

During downward movement of the rod 37 and consequently of the turnbuckle 32 as well as the crosshead 31 and the links 30 the toggle links 25 and 27 move into aligned relation whereby the clutch race 22 is fully retracted but no movement has as yet been imparted to the shaft 15 due to the over-running nature of the outer race 22. Thereafter, however, continued downward movement of the motor parts causes the toggle comprised of the links 25 and 27 to break on the other side of the plane above mentioned to thereby forcibly rotate the clutch race 22 back toward its advanced position, imparting an increment of rotation of movement to the drive shaft 15 of predetermined dimension which can be readily controlled as will hereinafter become more fully apparent.

To control the length of stroke of the fluid motor employed and thus to control the longitudinal spacing of the successive indexed positions of the workpieces as well as to cushion the deceleration of the reciprocating and other intermittently moving parts of the drive motor the structure above described functions as follows: When the upper cylinder 34 is being energized as above described the fluid in the lower cylinder outwardly of the piston 35 and the ring 36 therein is being exhausted through the ports 45 contained in the valve core 40 housed within the lower tubular member 39 and through conduit 56. As the end of downward stroke is reached the lower end of the lower rod 37 contacts the upper end of the lower valve core 40 and the latter begins to move whereby the ports 45 therein pass into the restricted section 80 of the bore in the lower tubular member 39 and thus the exit of fluid from the lower cylinder is gradually diminished to controllably decelerate the moving parts. Thereafter, the leakage of fluid between core 40 and the restricted portion 80 of the bore in the tubular member 39 will allow the piston in the lower cylinder 34 to gradually bottom.

The above cycle of operation takes place during one period of energization of the solenoid 52. If now the switch 57 is opened to deenergize solenoid 52 whereby spring 54 moves the core of valve 50 back to its initial starting position fluid is admitted to the lower cylinder 34 through conduit 56 and conduit 49 is connected to the exhaust. At this time the upper rod 37 will be spaced from the upper valve core 40 and the fluid in the upper cylinder 34 can bleed out through the ports 45 and bore 41 of the valve core 40. As the upper piston 35 approaches the end of its upward stroke upper valve core 40 is engaged to gradually close off ports 45 thereby entrapping the fluid remaining in the upper end of cylinder 34 to cushion the deceleration of the parts. Again, leakage about the barrel of upper core 40 allows the upper piston 35 to slowly seek its uppermost position.

Since one of the opposed cylinders 34 continues to exert force and movement until the piston in the other of the cylinders 34 has bottomed it is obvious that the length of stroke may be varied simply by varying the spacing between the pistons in the respective cylinders and this may be accomplished by rotating the turnbuckle 32 as will be understood. By shortening this spacing a longer stroke is obtained to give a longer increment of indexing movement to the welding wheel 10. During each stroke of the fluid motive means only a portion of the elapsed time is consumed by indexing movement, the remaining portion being available for the "dwell" time of the electrodes during which dwell time a current pressure cycle may be applied to the electrodes 10 and 11 and workpieces 13 and 14, for example, to effect a spot weld. If the adjusted position of turnbuckle 32 is centralized the indexing time and the dwell time during each stroke will be equalized and this will remain true during any adjustment of the turnbuckle 32 provided the threads on the two rods 37 have equal pitch. If desired, provision may be made for the individual adjustment of the lengths of the two rods 37 whereby successive indexing movement will have different dimensions but with spacing between alternate indexed positions being equal. Thus, the mechanism may be adjusted to give two spots close together on the work and then a larger space before coming to the next two succeeding spots. This is desirable in some classes of work.

By simply reversing the operating direction of the clutch parts 21 and 22 we may cause the indexing movement to take place during the first portion of each stroke of operation of the fluid motor rather than during the last portion thereof as in the arrangement described above and this change in arrangement is advantageous in that the time consumed in the cushioning and bottoming of the cylinders in either direction of movement always occurs during the dwell period of the roller electrode or other driven part. Also, this arrangement would assure "sine wave" deceleration of the electrodes and workpieces at the end of each indexing movement to prevent overrunning and to assure positional stability of the electrodes and the workpieces during the actual welding cycles.

To give a visual indication of the extent of indexing movement being effected in each cycle we provide a vernier scale comprising a fixed part 58 which is rigidly mounted on the housing 16 and a movable part 59 which is rigidly carried by the segmental lug 23 which is in turn secured to the clutch race 22 as explained above. A principal scale 58a reading in degrees is affixed on the part 58 and the vernier scale 59a reading in minutes is affixed on the part 59.

Shaft 15 is retained in indexed position by a friction brake comprised of the shoes 60 and 61 which are biased inwardly against a collar 62 keyed on the shaft, a spring 63 being provided for effecting this bias.

Figure 6:
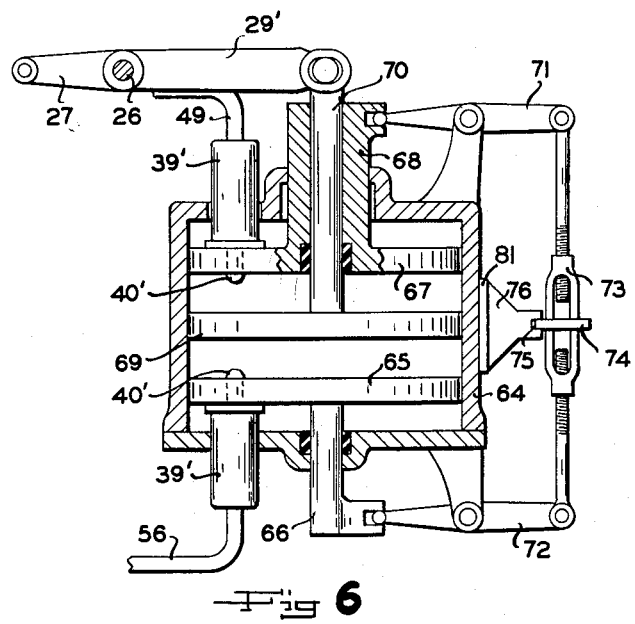
Figure 6 is a sectional view through a modified form of fluid motor which may be utilized in the assembly of Figures 1 and 3.

In Figure 6 we have illustrated a double-acting fluid motor which may be substituted bodily for the motor comprised of the parts 30 through 48 of the apparatus first described above. In this embodiment we provide a double ended cylinder 64 in which is positioned the lower piston 65 carried by a stem 66 which projects outwardly of the lower end of cylinder 64. Also provided is an upper piston 67 which is carried by a hollow stem 68 projecting upwardly out of the upper end of cylinder 64. An operating piston 69 is positioned intermediate the pistons 65 and 67 and is carried by a rod 70 which extends through the stem 68 and which is pivotally connected at its outer end to a lever 29' which, in the integration of the apparatus with the assembly of Figures 1 through 5, would take the place of the levers 29. Thus, lever 29' would be keyed to the shaft 26 for operating the toggle link 27.

The length of stroke of the operating piston 69 may be varied while yet maintaining its center of operation fixed by moving the pistons 65 and 67 inwardly and outwardly in equal amounts and this is accomplished by the levers 71 and 72 which are pivoted on the cylinder 64 and which at one end engage the stems 68 and 66, respectively. The opposite ends of levers 71 and 72 are connected together by a turnbuckle 73 which has affixed thereto an annulus 74 which engages in a slot 75 formed in a retaining member 76. The retaining member 76 has a flange-like base plate 81 which is adjustably and slidably received in suitable ways, not particularly shown, provided on the outer surface of the cylinder 64. So long as the latter is detained in a fixed position rotation of the turnbuckle 73 in one direction moves the limiting pistons 65 and 67 outwardly in equal increments while upon rotation of the turnbuckle in the opposite direction the limiting pistons are moved inwardly to shorten the length of the stroke. By adjusting the retaining member 76 upwardly or downwardly the operational center of the piston 69 may be shifted to give unequal spacing to the successive indexing movements as explained above.

The end walls of cylinder 64 are apertured to slidably receive the tubular members 39' which are rigidly secured at their inner ends in threaded apertures formed in pistons 65 and 67. The tubular members 39' correspond in structure and function to the members 39 in the first described embodiment and each contain all the mechanism contained in the members 39, the only modification being that the valve cores 40 are each provided at their inner ends with an integral projection 40' which is arranged to be engaged by the piston 69 during normal operation of the same. Thus, the piston 69 is brought to a fluid cushioned stop at the end of its stroke in either direction. As shown, the fluid supply conduits 56 and 49 of the system are connected to supply fluid under pressure to the bottom and top sides, respectively and alternately, of the piston 69 through the members 39' during normal operation of the system.

It should be particularly noted that in either of the embodiments described above two indexing movements are effected for each energization of the solenoid 52 and thus for each full cycle of operation of the valve 50. This enables high speed machine operation while yet keeping the speed of operation of the solenoid valves 50, 52 and of the switch 57 within reasonable limits. The operating speed of the indexing mechanism proper, however, may be quite high due to the cushioning of the fluid cylinders under any condition of adjustment and to the fact that the final bottoming of the pistons in the fluid cylinders may be made to take place during the time interval that is consumed in the actual welding or in other working process as the case may be. Of course, the actual speed of operation of the indexing drive once the switch 57 has been opened (or closed) is determined by the volumetric rate of fluid supply and a high potential rate of operation may accordingly be assured by making the fluid supply conduits and the ports in valve 50 rather large. Suitable metering valves, not shown, may be employed to control the rate of fluid flow.

It should now be apparent that we have provided an improved drive for welding electrodes or other machine elements capable of effecting highly versatile movement patterns therein which accomplishes the objects initially set out. In addition to the instantaneous changeover from continuous to intermittent movement and vice versa the arrangement provides for infinite adjustment of the dimension of indexing movement from zero to the maximum capacity of the installation, provides for unequal dimensioning in successive indexing movements, if desired, and provides for unlimited extension of the dwell time periods. The latter results from the employment of the control switch 57 which may be opened and closed as rapidly as desired. The employment of this switch is further advantageous in many applications as well as in resistance welders since it may be employed as an element to synchronize the flow of weld current or other operation during the dwell periods.

The above specifically described embodiment of the invention should be considered as illustrative only as obviously many changes may be made therein without departing from the sphere or scope of the invention. Reference should therefore be had to the appended claims in determining the scope of this invention.

We claim:

1. A double-acting reciprocating fluid pressure motor comprising a pair of opposed cylinders, a piston in each of said cylinders comprising a disc and a flexible diaphragm secured to said disc and having its outer periphery secured to the side wall of said cylinder, a common drive rod assembly interconnecting said pistons and forming the driving means of said fluid pressure motor, means to supply fluid pressure into an opposed set of ends of said cylinders to reciprocate said drive rod assembly, means to vary the length of stroke of said drive rod assembly, and said last mentioned means comprising means to adjust the length of said drive rod assembly to change the position of said pistons within said cylinders.

2. A double-acting reciprocating fluid pressure motor comprising a pair of opposed cylinders, a piston in each of said cylinders comprising a disc and a flexible diaphragm secured to said disc and having its outer periphery secured to the side wall of said cylinder, a common drive rod assembly interconnecting said pistons and forming the driving means of said fluid pressure motor, means to supply fluid pressure into an opposed set of ends of said cylinders to reciprocate said drive rod assembly, and means to cushion and control the deceleration of said drive rod assembly at the end of its stroke.

3. Apparatus according to claim 2 further characterized in that said means to cushion comprises slide valve means in said means to supply fluid pressure to said cylinders, and said drive rod assembly engaging said slide valve means upon said drive rod assembly approaching the end of each of its stroke to actuate said slide valve means.

4. A double-acting reciprocating fluid pressure motor comprising a pair of opposed cup-like cylinders opening inwardly toward each other, a disc-like piston in each cylinder, an annular flexible diaphragm in each cylinder having its inner periphery secured to the outer periphery of the disc therein and having its outer periphery secured to the side wall of the cylinder, a drive rod mounted for longitudinal reciprocating and having its end portions engaging said pistons, means to supply fluid pressure into the outer end portions of said cylinders, said means to supply comprising a port disposed on the end wall of each cylinder, each of said cylinders having a tubular fitting extending outwardly of said end wall and in communication with said port, said rod having an extension which projects into said fitting, a fluid conduit opening into the outer end of said fitting, and a slide valve in said fitting intermediate the outer end thereof and the outer extremity of said rod adapted to be engaged by said rod upon the same approaching the end of its outward stroke to progressively diminish the rate of discharge of fluid through said fitting.

5. Apparatus according to claim 4 further characterized in that said slide valve comprises a core, means to limit inward sliding movement of said core, spring means to yieldably retain said core in its inner position, said tubular fitting having a portion of reduced diameter intermediate its ends, said core having a longitudinal bore extending inward from its outer end, radial apertures in the side wall of said core at the inner end of the last mentioned bore, the inner end of said core being formed with a closed chamber the outer end of which constitutes the bottom wall of the bore in said core, a centrally disposed aperture in said bottom wall, a spring-pressed ball check in said chamber for normally closing said last mentioned aperture, and the side wall of said chamber having radial openings therein.

6. A cushioning valve for reciprocating air-operated devices comprising a tubular fitting having a bore portion of reduced diameter intermediate its ends, a valve core slidably received in said bore portion and having an outwardly disposed flange at its outer end to engage a shoulder of said bore portion to thereby limit the inward sliding movement of said core, spring means to yieldably retain said core in inner position, said core having a bore extending longitudinally inward from its outer end, radial apertures in the side wall of said core at the inner end of said last mentioned bore, the arrangement being such that upon said core being held in inner position said apertures are spaced inwardly from said bore portion to thereby provide a passageway longitudinally through said fitting, the inner end portion of said core being formed with a closed chamber the outer wall of which constitutes the bottom wall of the bore in said core, a centrally disposed aperture in said bottom wall, a spring-pressed ball check in said chamber for normally closing said last mentioned aperture, and the side wall of said chamber having radial openings therein, and means adapted to be slidably operated by the reciprocating device to engage the inner end of said core to move the same outwardly whereby said first mentioned apertures are covered by said bore portion of reduced diameter.

7. In apparatus for imparting movement to a driven element through driving linkage, a double-acting reciprocating fluid pressure motor having a reciprocating driving member connected to said linkage and a pair of opposed expansible fluid chambers, means to supply fluid under pressure to said fluid chambers whereby said driving member may be forcibly reciprocated, means to vary the length of stroke of said driving member, and means to control the deceleration of said driving member at the ends of its stroke.

8. Apparatus according to claim 7 further characterized in that said means to vary the length of stroke comprises adjustment means for initially and adjustably enlarging or reducing at least one of said expansible fluid chambers to adjustably limit the movement of said driving member.

9. Apparatus according to claim 7 further characterized in that said means to vary the length of stroke comprises linkage means interconnecting like portions of said expansible fluid chambers, and means to shorten or lengthen said linkage means to initially and adjustably change the position of at least one of said like portions thereby effectively enlarging or reducing at least one of said expansible fluid chambers.

10. Apparatus according to claim 7 further characterized in that said means to control the deceleration of said driving member comprises a port for each of said expansible chambers, each of said fluid chambers having a tubular fitting extending outwardly thereof and in communication with said port, a fluid conduit opening into the outer end of said fitting, and a slide valve in said fitting intermediate the outer ends thereof and the outer extremity of said driving member adapted to be engaged by said driving member upon the same approaching the end of its stroke to progressively diminish the rate of discharge of fluid through said fitting.

11. Apparatus according to claim 7 further characterized in that said means to supply fluid under pressure comprises a two position four way valve having a valve core for alternately connecting said fluid chambers with a source of fluid pressure and exhaust, actuating means comprising switching means and a solenoid for moving said valve core from one position to another, and a return spring for moving said valve core back to its original position.

12. A double-acting reciprocating fluid pressure motor comprising a fluid housing having a pair of fluid chambers and a movable piston, driving means connected with said movable piston, means to supply fluid under pressure to said fluid chambers to cause reciprocation of said piston and said driving means, said fluid chambers having movable end walls, and adjustable linkage means interconnecting said movable end walls for adjusting the position of the same to enlarge or decrease said fluid chambers to adjust the stroke of said movable piston and said driving means.

13. In apapratus for imparting an intermittent movement to a driven element through uni-directional driving linkage, a double-acting reciprocating fluid pressure motor having a reciprocating driving member connected to said linkage and a pair of opposed expansible fluid chambers adapted to be alternately supplied with fluid under pressure and each having a movable wall engaging said driving member whereby said driving member may be forcibly reciprocated, means to vary the length of stroke of said driving member, and means to control the deceleration of said driving member and movable walls at the end of their strokes.

References Cited in the file of this patent

UNITED STATES PATENTS

| | | |
|---|---|---|
| 2,157,367 | Warner et al. | May 9, 1939 |
| 2,575,934 | Timmerman | Nov. 20, 1951 |
| 2,625,886 | Browne | Jan. 20, 1953 |
| 2,676,572 | Perry et al. | Apr. 27, 1954 |
| 2,679,209 | Fischer et al. | May 25, 1954 |
| 2,778,342 | Ringman | Jan. 22, 1957 |
| 2,781,026 | Schlatter et al. | Feb. 12, 1957 |